US012451479B2

(12) United States Patent
Raji et al.

(10) Patent No.: US 12,451,479 B2
(45) Date of Patent: Oct. 21, 2025

(54) CATHODE WITH LAYERS OF ANODE REDUCTANT AND SOLID-ELECTROLYTE INTERPHASE

(71) Applicant: Zeta Energy LLC, Houston, TX (US)

(72) Inventors: Abdul-Rahman Olabode Raji, Houston, TX (US); Tuo Wang, Houston, TX (US); Rodrigo Villegas Salvatierra, Houston, TX (US)

(73) Assignee: Zeta Energy LLC, Houston, TX (US)

( * ) Notice: Subject to any disclaimer, the term of this patent is extended or adjusted under 35 U.S.C. 154(b) by 710 days.

(21) Appl. No.: 17/741,251

(22) Filed: May 10, 2022

(65) Prior Publication Data

US 2022/0367850 A1 Nov. 17, 2022

Related U.S. Application Data

(60) Provisional application No. 63/187,585, filed on May 12, 2021.

(51) Int. Cl.
| | |
|---|---|
| *H01M 4/13* | (2010.01) |
| *H01M 4/136* | (2010.01) |
| *H01M 4/1397* | (2010.01) |
| *H01M 4/62* | (2006.01) |
| *H01M 10/0525* | (2010.01) |

(52) U.S. Cl.
CPC ......... *H01M 4/1397* (2013.01); *H01M 4/136* (2013.01); *H01M 4/628* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2015/0364791 | A1* | 12/2015 | Vu | H01M 4/366 429/306 |
| 2019/0058211 | A1* | 2/2019 | Yang | H01M 10/0568 |
| 2019/0181441 | A1 | 6/2019 | Ji et al. | |
| 2020/0251775 | A1 | 8/2020 | Kovacs et al. | |

OTHER PUBLICATIONS

"Atomic layer deposition of TiO2 on negative electrode for lithium ion batteries" in Journal of Power Sources 244 (2013) 410-416 to Lee (Year: 2013).*

(Continued)

*Primary Examiner* — Wyatt P McConnell
(74) *Attorney, Agent, or Firm* — Silicon Edge Law Group LLP; Arthur J. Behiel

(57) ABSTRACT

Described is a lithium-sulfur electrochemical cell in which the anode and the cathode are each equipped with a respective solid-electrolyte interphase (SEI) layer that inhibits lithium side reactions. On the cathode side, the SEI layer inhibits the shuttle effect by retaining soluble polysulfides within a cathode active layer while releasing and admitting lithium ions to and from the electrolyte. The cathode SEI is deposited, during cell formation, by depositing a layer of an anode reductant (e.g., metallic lithium) on the surface of the cathode. The resultant electrically conductive layer allows electrons to reduce adjacent electrolyte and form the cathode SEI from electrolyte decomposition products.

23 Claims, 2 Drawing Sheets

(56) References Cited

OTHER PUBLICATIONS

Guo et al., "Facile Formation of a Solid Electrolyte Interface as a Smart Blocking Layer for High-Stability Sulfur Cathode," Advanced Materials 2017, 170027, Apr. 24, 2017, 7 pages.

Officer Kari Rodriguez, International Search Report and Written Opinion; PCT/US2022/28598; date of mailing Oct. 6, 2022, 14 pages.

Kuhn et al., "Face to Face at the Cathode Electrolyte Interphase: From Interface Features to Interphase Formation and Dynamics," Advanced Materials Interfaces, Jan. 2, 2022 (16 pages).

Li, N. et al. "An Artificial Solid Electrolyte Interphase Layer for Stable Lithium Metal Anodes". Adv. Mater. 2016, 28 (9), 1853-1858 (7 pages).

Liu, Y. et al. "An Artificial Solid Electrolyte Interphase with High Li-Ion Conductivity, Mechanical Strength, and Flexibility for Stable Lithium Metal Anodes". Adv. Mater. 2017, 29, 1605531 (8 pages).

Luo et al., "A chemically stabilized sulfur cathode for lean electrolyte lithium sulfur batteries," Proceedings of the National Academy of Sciences (PNAS.org), Jun. 30, 2020 (9 pages).

Wang et al., "Compositions and Formation Mechanisms of Solid-Electrolyte Interphase on Microporous Carbon/Sulfur Cathodes," Chemistry of Materials 2020, 32, 3765-3775 (11 pages).

Wang et al., "Review on modeling of the anode solid electrolyte interphase (SEI) for lithium-ion batteries," nature partner journals (npj), Computational Materials, Mar. 26, 2018 (26 pages).

Wu et al., "A pre-lithiation method for sulfur cathode used for future lithium metal free full battery," Journal of Power Sources 2016 (9 pages).

Yu et al., "Electrode-Electrolyte Interfaces in Lithium-Sulfur Batteries with Liquid or Inorganic Solid Electrolytes," Acc. Chem. Res. 2017, 50, 2653-2660 (8 pages).

Zhan et al., "Using Li2S to Compensate for the Loss of Active Lithium in Li-ion Batteries," Electrochimica Acta 255 (2017) 212-219 (8 pages).

Zhang et al., "Cathode-Electrolyte Interphase in Lithium Batteries Revealed by Cryogenic Electron Microscopy," CelPress Open Acess, Matter 4, 302-312, Jan. 6, 2021 (40 pages).

Zheng et al. "In Situ formed lithium sulfide/microporous carbon cathodes for lithium-ion batteries," ACS Nano, vol. 7, No. 12, 2013, pp. 10995-11003, 9 pages.

\* cited by examiner

CATHODE WITH LAYERS OF ANODE REDUCTANT AND SOLID-ELECTROLYTE INTERPHASE

BACKGROUND

An electric battery includes one or more electrochemical cells. Each cell includes a positive electrode (cathode) and a negative electrode (anode) physically separated by an ion conductor (electrolyte). When a cell is discharged to power an external circuit, the anode supplies negative charge carriers (electrons) to the cathode via the external circuit and positive charge carriers (cations) to the cathode via the electrolyte. Chemists refer to the loss of electrons at the anode as "oxidation" and the gain of electrons at the cathode as "reduction."

While charging, an external power source drives electrons from the cathode to the anode via the power source and cations from the cathode to the anode via the electrolyte. Technically, with this reversal of currents the anode becomes the cathode and vice versa, with oxidation and reduction now taking place at the opposite electrodes. For clarity, however, the terms "anode" and "cathode" are defined in the context of cell discharge, the anode being oxidized (losing electrons) and the cathode reduced (gaining electrons).

The lithium-sulfur cell is a type of rechargeable electrochemical cell that is notable for its high specific energy. Lithium-sulfur cells can reach or surpass 500 Wh/kg, significantly better than the 150-250 Wh/kg of commercially available lithium-ion cells. Also advantageous, the active cathode material in lithium-sulfur cells—predominantly sulfur—is inexpensive and its obtention environmentally benign relative to the cobalt, manganese, and nickel of popular lithium-based cell chemistries.

Cell life has been the biggest obstacle to broader market acceptance of lithium-sulfur cells. Conventional lithium-sulfur cells lose sulfur from the active cathode layer when elemental sulfur reacts with lithium ions in the electrolyte to form soluble lithium polysulfides. In this deleterious process, sometimes referred to as the shuttle effect, lithiated polysulfides shuttle sulfur from the cathode through the electrolyte to plate on the anode layer during charging. The shuttle effect both reduces storage capacity and increases internal resistance.

BRIEF DESCRIPTION OF THE DRAWINGS

The present invention is illustrated by way of example, and not by way of limitation, in the figures of the accompanying drawings and in which like references refer to similar elements and in which.

DETAILED DESCRIPTION

The following disclosure details electrochemical cells in which the anode and the cathode are each equipped with a solid-electrolyte interphase (SEI) layer that inhibits deleterious side reactions. On the cathode side, the SEI layer inhibits the shuttle effect by retaining soluble polysulfides within the cathode while releasing and admitting ions to and from the electrolyte. The cathode SEI layer is formed by depositing an electrically conductive layer of the anode reductant (e.g., metallic lithium) on the surface of the cathode. The neighboring electrolyte is reduced to form the passivating SEI layer on the cathode. During subsequent charging, some or all of the reductant may be removed from the cathode, thereby leaving the cathode SEI directly on the cathode surface.

Figure 1:
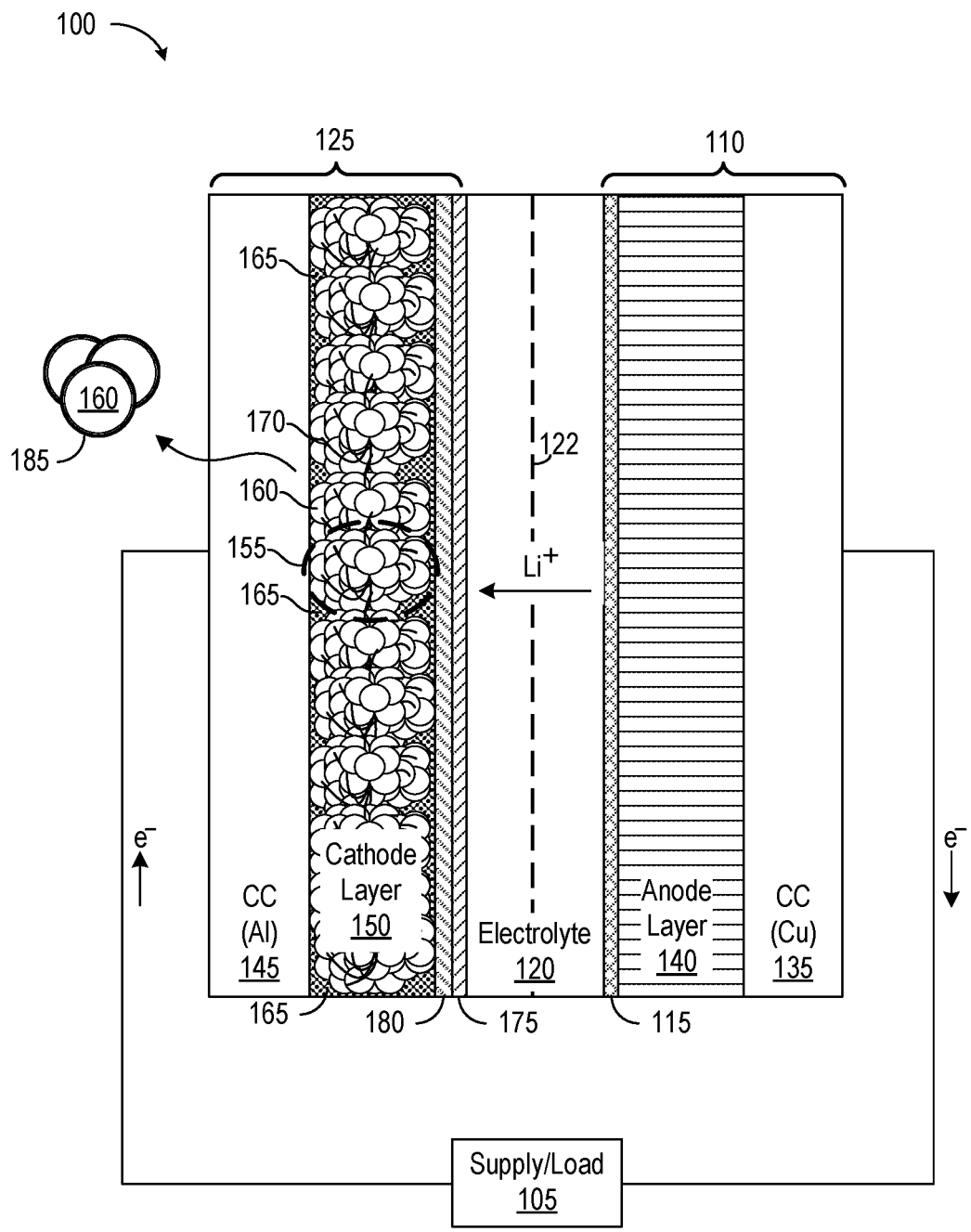
FIG. 1 depicts a lithium-sulfur electrochemical cell 100 electrically connected to power management systems 105 that can serve as a power source to charge cell 100 or a load to discharge cell 100.
Figure 1:
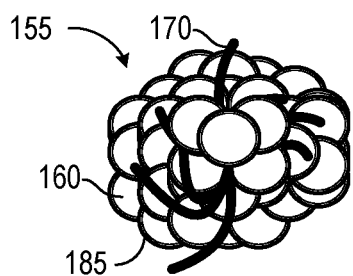

FIG. 1 depicts a lithium-sulfur electrochemical cell 100 electrically connected to a power-management system 105 that can serve as a power source to charge cell 100 or a load to discharge cell 100. Cell 100 includes a lithium anode 110, an electrolyte 120, and a sulfurized-carbon cathode 125. Cell 100 delivers electrical power in discharge via an oxidation-reduction (redox) reaction in which metallic lithium is the reductant (electron donor) and sulfurized carbon the oxidant (electron recipient). The metallic lithium is thus oxidized and the sulfurized carbon reduced. Electrolyte 120 includes a salt of the anode reductant and, if liquid, can saturate a permeable membrane—a separator 122—between anode 110 and cathode 125.

Anode 110 includes a current collector 135 of e.g. copper physically and electrically connected to an anode active-material layer 140 of metallic lithium or a combination of metallic lithium and/or lithium ions and some form of porous carbon. An SEI layer 115 is formed on the surface of the anode active material from decomposition products of electrolyte 120. SEI layer 115 is deposited during a cell formation cycle when the electrode potential of layer 140 lies outside the electrochemical stability window of electrolyte 120. SEI layer 115 passivates layer 140, minimizing further electrolyte decomposition, while conducting lithium ions and blocking the flow of electrons.

Cathode 125 includes a current collector 145 of e.g. aluminum physically and electrically connected to a cathode layer 150, a composite that includes distinct agglomerates 155, an example of which is illustrated separately at bottom left. Each agglomerate 155 includes a collection of sulfurized-carbon particles 160 interconnected by sp2-bonded carbon nanomaterials 170, such as carbon nanotubes, nanoribbons, and/or carbon black. Agglomerates 155 are embedded in a binder 165 that physically and electrically connects agglomerates 155 to one another and to current collector 145. Sulfurized-carbon particles 160 have high concentrations of sulfur, greater than 40 wt % in some embodiments. Most of the carbon atoms with adjacent sulfur atoms, including those carbon atoms of carbon nanomaterials 170, are bonded to the adjacent sulfur atoms via covalent carbon-sulfur bonds that suppress the formation of undesirable polysulfides.

A layer 175 of a cathode SEI and a layer 180 of the anode reductant, e.g. metallic lithium, separate the cathode active material (the oxidant) of particles 160 from electrolyte 120 (outer-surface electrolyte). There is some electrolyte within porous cathode layer 150 as well, an inner-surface electrolyte absorbed into cathode layer 150 within and between agglomerates 155. As shown to the left of cell 100, cathode particles 160 are wholly or partially coated with a cathode-electrolyte interphase (CEI) layer 185, which collectively forms a matrix that extends throughout the inner surfaces of porous cathode layer 150. Both cathode SEI layer 175 and CEI 185 suppress lithium side reactions to prevent soluble lithium polysulfides (e.g. $Li_2S_x$ ($6 \leq x \leq 8$)) from leaking into electrolyte 120 from the cathode active-material layer 150, and thus degrading cell 100. The cathode SEI and CEI also prevent degraded components or species from anode SEI 115 that are soluble in the electrolyte 120 and transported across separator 122 from reaching the cathode active material of layer 150.

Metallic lithium, the reductant in anode layer 140, is oxidized (electron loss) during cell discharge. Electrons pass from anode layer 140 to cathode layer 150 via current collectors 135 and 145 and, in this illustration, a power-management system labeled supply/load 105. The current collectors 135 and 145 are in contact with at least a portion of the anode layer 140 and the cathode layer 150, respectively. The active material within cathode layer 150, the sulfurized-carbon oxidant in this embodiment, is reduced (electron gain) within agglomerates 155 to form lithium-sulfur compounds, which may include polysulfide salts. The net process involves lithium cations (Li+) from anode layer 140 passing to cathode layer 150 via electrolyte 120 and both SEI layers 115 and 175. Charging reverses this process by stripping lithium ions and electrons from cathode layer 150 and returning them to anode layer 140.

When cell 100 is discharged, lithium from anode layer 140 reduces the sulfurized carbon, partially producing lithium-sulfur species. When the electrode potential of cathode layer 150 is less than about 1.5 V, components of electrolyte 120 are also reduced within and between sulfurized-carbon particles 160 to form the matrix of CEI 185 that extends through agglomerates 155 on surfaces of e.g. particles 160 as the sulfurized carbon is further lithiated. When cell 100 is discharged with a cathode potential below about zero volts, a layer of metallic lithium—the reductant anode active material—forms over cathode layer 150. Metallic lithium, an electron conductor, facilitates reduction of electrolyte 120 and thus the formation of SEI layer 175, a passivating layer of electrolyte decomposition products. CEI 185 that extends through active layer 150 and the SEI of layer 175 work together to inhibit the shuttle effect and improve cell life.

SEI 175 may be compositionally similar to CEI 185, though it is difficult to assess the chemical and physical properties of each in detail. Both are electrolyte decomposition products in the forgoing example, and this decomposition takes place amid similar chemistries of electrolyte 120 and cathode layer 150. The morphology and composition of the cathode SEI 175 and CEI 185 depend upon the chemistry of electrolyte 120 and the reductant. In the case of lithium-based cells, for example, CEI 185 and cathode SEI 175 can include e.g. at least one of lithium oxide, lithium carbonate, and lithium fluoride. In other lithium-based embodiments, the cathode CEI and SEI can include at least one of lithium organofluorides, lithium alkyl fluoride, lithium organocarbonates, lithium-containing oligomers, and lithium-containing polymers. The material of SEI layer 175 can be distinguished from CEI 185 by location and geometry. CEI 185 extends throughout cathode layer 150, whereas cathode SEI layer 175 is disposed between cathode layer 150 and electrolyte 120.

Figure 2:
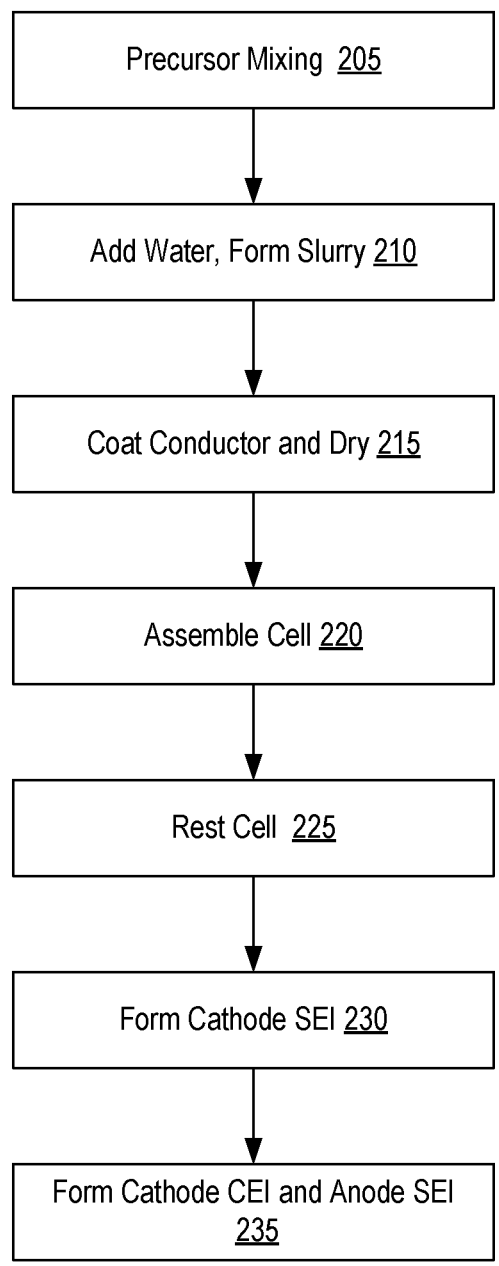
FIG. 2 is a flowchart 200 describing a process for forming a cathode in accordance with one embodiment.

FIG. 2 is a flowchart 200 describing a process for forming a cathode in accordance with one embodiment. At 205, a sulfurized carbon active material is mixed with carbon black and polyacrylic acid at a ratio of 9:1:1 using a planetary centrifugal mixer at 1500 rpm for 10 min. Then, at 210, water is added to the powder mixture, after which it is further mixed at 1500 rpm for 20 min to obtain a slurry. The slurry is blade-coated on a carbon-coated aluminum foil (14 μm, 1 μm carbon film on each side) to produce a film, which is dried at 70° C. for 30 min in ambient air and further dried at 70° C. for 12 h in vacuum (step 215). The cathode film has a specific capacity of about 500 mAh $g^{-1}$ relative to cathode active material mass and an areal capacity of about 2 mAh $cm^{-2}$ between 1 V (discharge) and 2.6 V (charge) in this embodiment. In step 220, an electrochemical cell is assembled using e.g. the sulfurized carbon cathode (2 mAh $cm^{-2}$), a lithium-foil anode (16 mm diameter) pressed on a copper disk (16 mm diameter), a 16 μm polyethylene separator, and an electrolyte containing 4 M lithium bis (fluorosulfonyl)imide (LiFSI) salt dissolved in 1,2-dimethoxyethane (DME) solvent. An electrolyte concentration of at least 2 M improved cycle performance compared with standard 1 M electrolyte concentration due to a formation of more compact or denser SEI, with greater inorganic SEI components from the salt degradation products. The lithium foil can be 35 μm thick, with a lithium capacity of 7 mAh $cm^{-2}$, which is about 3.5 times the capacity of cathode 125. After assembly, the cell is rested for 24 h (step 225).

Next, in step 230, the rested cell is discharged to move about 6.5 mAh $cm^{-2}$ of metallic lithium from the anode side to the sulfurized carbon on the cathode side (e.g., from anode layer 140 to cathode layer 150). Some of the lithium is inserted into agglomerates 155 and particles 160, some is plated as a reductant layer on the surface of cathode layer 150. The lithium anode-reductant layer 180 provides an electron path that facilitates electrolyte reduction and decomposition that forms SEI layer 175.

Anode-reductant layer 180 is not electrochemically a "reductant" in the initial formation of SEI layer 175 but is termed an "anode-reductant layer" because it is made of an electron donor commonly used as an anode reductant, the same reductant used in anode 110 in this embodiment. In other words, anode 110 includes metallic lithium as cell reductant to reduce the oxidant of cathode 125 during cell discharge, and cathode 125 includes a layer 180 of the cell reductant. The material of layer 180 can also serve as reductant of electrolyte 120 and cathode 150 e.g. during resting of the cell after discharge, which can thicken the matrix of CEI 185 and SEI layer 175. In forming anode-reductant layer 180, the discharge of cell 100 is controlled externally (the discharge is not powered by the cell alone) such that cathode layer 150 is plated with metallic lithium responsive to the applied current, a process similar to the formation of anode-side SEI 115. The formation of anode-side SEI is well known to those of skill in the art so a detailed discussion is omitted.

Cell voltage is the potential difference between cathode (connected to a positive terminal) and anode (connected to a negative terminal) and is typically held positive to remove lithium ions from the anode material of layer 140 and insert them into the cathode material of layer 150. The amount of metallic lithium at anode 110 (in mAh cm') exceeds the lithium storing capacity of cathode 125. At cell voltages below about zero volts, excess lithium is deposited on cathode layer 150 as anode-reductant layer 180, which can be a few tens of nanometers thick. Cathode SEI layer 175 then forms by decomposition of the electrolyte on the surface of anode-reductant layer 180.

Having formed cathode-side SEI of layer 175, cell 100 is charged (step 235) and both the CEI 185 and the anode-side SEI of layer 115 are formed. In charging, the matrix of CEI 185 forms when portions of the electrolyte in contact with cathode layer 150 are reduced. The metallic lithium of anode-reductant layer 180 is removed from the cathode surface, as are the inserted Li ions (and electrons) in the sulfurized carbon of particles 160. The removed lithium is plated on anode layer 140. In an embodiment in which anode layer 140 is metallic lithium over a copper (Cu) current collector, the metallic lithium is plated to form anode layer 140 by charging cell 100 to 2.6 V. After the first cycle of discharge to below 0 V and charge to 2.6 V at a rate of 0.2 mA cm-2, the cell is cycled between 1 V (discharge) and 2.6 V (charge) at a current density of 0.4 mA cm$^{-2}$ in one embodiment.

In charging, the metallic lithium removed from cathode 125 considerably exceeds what is reversibly stored during the electrochemical cycling of normal cell operation. The excess lithium allows for the formation of relatively thick, robust SEI layers 115 and 175 (e.g. thickness of above 50 nm, and with even more excess lithium above 100 nm). Anode 110 stores lithium in excess of what is reversibly cycled. In one embodiment, anode layer 140 begins with three times the metallic lithium required for normal operation. The robust SEI layers 115 and 175 resist degradation and thus improve coulombic efficiency and extend cell life.

Anode layer 140 comprises bundles of carbon nanotubes in some embodiments. Rather than a planar layer, as depicted in FIG. 1, the anode SEI extends within and between the carbon nanotubes, coating the sidewalls of the nanotubes and bundles of nanotubes. In charging, lithium ions traverse the anode SEI and are reduced on the sidewalls of the nanotubes and bundles to form metallic lithium between the nanotubes and the anode SEI.

Lithium-based batteries commonly use aluminum as cathode current collector. In the method of FIG. 2, however, the aluminum of current collector 145 can alloy with excess lithium and thus inhibit the formation of anode-reductant layer 180 and SEI layer 175. Carbon-coated aluminum obtained solution-coating has sufficient porosity to permit lithium transport through it, thus it does not offer much protection against alloying of lithium with aluminum. Current collectors, e.g. copper, nickel, nickel-coated aluminum, and stainless steel do not readily absorb the excess lithium, and thus facilitate the formation of the SEI of layer 175 in some embodiments, requiring less excess lithium. The lithium-sulfur chemistry of cell 100 maintains the cathode voltage below about three volts, a potential relatively compatible with current collectors other than aluminum. In some embodiments, the dense carbon coating on aluminum is deposited using physical vapor deposition, e.g. e-beam evaporation, magnetron sputtering, ion-beam sputtering, ion-assisted e-beam evaporation, ion-assisted magnetron sputtering, and high-power impulse magnetron sputtering, to serve as a barrier between lithium and aluminum, thus effectively preventing alloying. In some embodiments, the thickness of such dense carbon coating is between 20 nm and 500 nm, such carbon coating requiring a thickness less than solution-deposited carbon coating due to the lower porosity of vapor-deposited carbon.

For a detailed discussion of sulfur cathodes and lithium anodes that can be adapted for use with the instant disclosure, see U.S. patent application Ser. No. 17/430,594 to Salvatierra, Raji, and Wang filed 12 Aug. 2021 and entitled "Sulfurized-Carbon Cathode with Conductive Carbon Framework," which is incorporated herein by reference to the extent that it provides exemplary, procedural, or other details supplementary to those set forth herein. This writing takes precedence over the incorporated application for purposes of claim construction.

In some embodiments, a layer of metallic lithium—the reductant anode active material—is placed in contact with cathode layer 150 in the form of a film or a foil, before or during assembly of cell 100 and the layer of metallic lithium is retained in contact with the cathode layer in the final assembled cell as a distinct reductant anode active material. The cell is discharged spontaneously and directly without a passage of electric current and through physical contact between metallic lithium 180 and cathode layer 150. After a rest period of e.g. 24 h after assembly of cell 100, a substantial amount of the metallic lithium 180 assembly has reacted with the active material of cathode layer 150. In some embodiments, heat (to attain a temperature up to e.g. 80° C.) is applied to speed up the reaction and electrolyte diffusion. Metallic lithium, a potent reductant, facilitates spontaneous reduction of electrolyte 120 and thus the formation of SEI layer 175, a passivating layer of electrolyte decomposition products. When the metallic lithium of layer 180 spontaneously reacts with cathode layer 150, lithium from anode layer 140 reduces the sulfurized carbon, producing lithium-sulfur species. Herein, "spontaneous" denotes the occurrence of reaction without application of external voltage rather than the rate at which the reaction occurs. Components of electrolyte 120 are also reduced within and between sulfurized-carbon particles 160 to form the matrix of CEI 185 that extends through agglomerates 155 on surfaces of e.g. particles 160. CEI 185 and SEI layer 175 work together to inhibit the shuttle effect and improve cell life. Anode-reductant layer 180 is chemically a "reductant" in the formation of the initial SEI layer 175 during initial rest of the cell.

In some embodiments, the thickness of the SEI layer 175 is increased by extending the rest time or adding heat to boost the reaction rate between the metallic lithium of anode-reductant layer 180. In some embodiments, electrolyte is added between the cathode layer 150 and metallic lithium of layer 180 to improve wetting of the cathode layer 150 and promote adhesion between cathode layer 150 and metallic lithium layer of 180. In some embodiments, an adhesion layer is deposited between cathode layer 150 and metallic lithium layer 180. In some embodiments, the metallic lithium layer of 180 is perforated to improve transport of electrolyte 120 transport to the cathode layer 150.

In some embodiments, the anode comprises metallic lithium plated within or on a host material, and only the metallic lithium is the active anode material, which is later plated on the cathode material during discharge. The host material functions as an electrical conductor or a framework for lithium deposition. In some embodiments, the anode host material for lithium deposition prevents dendrite formation. In some embodiments, the anode comprises carbon nanotubes plated with metallic lithium. In some cases of such embodiments, the carbon nanotubes are vertically aligned. In some cases of such embodiments, the metallic lithium is over and between the carbon nanotubes or bundles of carbon nanotubes.

In some embodiments, the anode materials may comprise graphite, hard carbon, activated carbon, silicon, silicon oxide, and/or metal oxides. In some embodiments, these anode materials may be pre-lithiated. In some embodiments, the anode materials may comprise metallic lithium deposited or placed on top of them or on their outer surface. In some embodiments, the anode comprises a group 1A element (periodic table) other than lithium, e.g. Na, K. In some embodiments, the anode comprises a group 2A element, e.g. Mg, Ca. In some embodiments, the anode comprises a transition metal element, e.g. Al.

In some embodiments, cathode layer 150 is predominantly sulfur. In some embodiments, cathode layer 150 may include a sulfur compound, a sulfur-carbon composite, or another group 6A element (periodic table) as the active material, e.g. selenium. In some embodiments, cathode layer 150 may include phosphorous as an active material. The cathode SEI prevents dissolution of cathode active material into the electrolyte in elemental or compound forms, e.g. polysulfides.

Current collectors are copper and aluminum films in the embodiment of FIG. 1 but can be of different materials or comprise e.g. tabs or terminals. The term "current collector" refers herein to any conductor that makes electrical contact with a portion or entire surface of the electrode active materials to facilitate electron exchange. Cathodes can have different types and formulations of oxidants, e.g., from the families of oxides, fluorides, and phosphates.

Representative methods, devices, and materials are described herein. Similar or equivalent methods, devices, and materials will be obvious to those of skill in the art in view of the forgoing teachings and can be used in the practice or testing of the presently disclosed subject matter. Additional variations of these embodiments will be obvious to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An electrochemical cell comprising:
    an anode including an anode reductant;
    an electrolyte including a salt of the reductant; and
    a cathode including:
        a cathode oxidant;
        cathode-electrolyte interphase (CEI) extending through the cathode oxidant;
        a solid-electrolyte-interphase (SEI) layer between the cathode oxidant and the electrolyte; and
        an anode-reductant layer between the cathode oxidant and the electrolyte.

2. The electrochemical cell of claim 1, wherein the anode-reductant layer consists essentially of the anode reductant.

3. The electrochemical cell of claim 2, wherein the anode-reductant layer separates the cathode oxidant from the SEI layer.

4. The electrochemical cell of claim 1, wherein the SEI layer consists essentially of decomposition products of the electrolyte.

5. The electrochemical cell of claim 4, wherein the decomposition products comprise at least one of lithium oxide, lithium carbonate, and lithium fluoride.

6. The electrochemical cell of claim 4, wherein the decomposition products comprise at least one of lithium organofluorides, lithium alkyl fluoride, lithium organocarbonates, lithium-containing oligomers, and lithium-containing polymers.

7. The electrochemical cell of claim 1, wherein the cathode oxidant comprises sulfur.

8. An electrochemical cell comprising:
    an anode including an anode reductant;
    an electrolyte including a salt of the reductant; and
    a cathode including:
        a cathode oxidant;
        cathode-electrolyte interphase (CEI) extending through the cathode oxidant; and
        a solid-electrolyte-interphase (SEI) layer between the cathode oxidant and the electrolyte;
    wherein the cathode oxidant comprises carbon and sulfur.

9. The electrochemical cell of claim 1, wherein the cathode includes inner cathode surfaces and an outer cathode surface, and wherein the CEI covers the inner cathode surfaces and the SEI layer covers the outer cathode surface.

10. The electrochemical cell of claim 9, wherein the cathode oxidant comprises particles of the cathode oxidant covered by the CEI.

11. The electrochemical cell of claim 9, wherein the SEI layer covers at least 90% of the outer cathode surface.

12. The electrochemical cell of claim 1, wherein the CEI forms a matrix within the cathode.

13. The electrochemical cell of claim 1, wherein the electrolyte comprises lithium bis(fluorosulfonyl)imide (LiFSI) and 1,2-dimethoxyethane (DME).

14. The electrochemical cell of claim 1, wherein the electrolyte has a concentration of at least 2 M.

15. The electrochemical cell of claim 1, wherein the cathode oxidant comprises at least one of an oxide, a fluoride, and a carbonate.

16. The electrochemical cell of claim 1, wherein the SEI is formed by electrochemical cycling of the reductant.

17. The electrochemical cell of claim 16, wherein the electrochemical cycling is a formation cycling.

18. The electrochemical cell of claim 1, wherein the SEI is formed by chemical reaction with the reductant absent electrochemical cycling.

19. A method of forming an electrochemical cell, the method comprising:
    forming a cathode including a cathode oxidant;
    applying an electrolyte to the cathode oxidant;
    applying an anode reductant to the electrolyte, the anode reductant separated from the cathode oxidant; and
    forming, on the cathode, a layer of the anode reductant.

20. The method of claim 19, further comprising decomposing the electrolyte on the layer of the anode reductant to form a solid-electrolyte interphase (SEI) layer on the cathode.

21. The method of claim 20, the cathode oxidant including inner surfaces of the cathode, the method further comprising decomposing the electrolyte on the inner surfaces of the cathode to form CEI within the cathode.

22. The method of claim 20, further comprising removing at least a portion of the anode reductant from the cathode, leaving the SEI on the cathode.

23. A cathode for an electrochemical cell, the cathode comprising:
    a current collector;
    a cathode-oxidant layer in electrical contact with the current collector;
    a matrix of cathode-electrolyte interphase extending through the cathode-oxidant layer opposite the current collector;
    a solid-electrolyte interphase layer over the cathode-oxidant layer opposite the current collector; and
    an anode-reductant layer between the solid-electrolyte interphase layer and the matrix of cathode-electrolyte interphase.

* * * * *